(12) United States Patent
Myers

(10) Patent No.: US 7,454,551 B2
(45) Date of Patent: Nov. 18, 2008

(54) RECONSTRUCTING TRANSACTION ORDER USING CLUMP TAGS

(75) Inventor: Matthew J. Myers, West Chicago, IL (US)

(73) Assignee: Synopsys, Inc., Mountain View, CA (US)

( * ) Notice: Subject to any disclaimer, the term of this patent is extended or adjusted under 35 U.S.C. 154(b) by 1084 days.

(21) Appl. No.: 10/855,192

(22) Filed: May 26, 2004

(65) Prior Publication Data

US 2005/0278511 A1    Dec. 15, 2005

(51) Int. Cl.
G06F 13/36    (2006.01)
(52) U.S. Cl. .......................... 710/310; 710/39
(58) Field of Classification Search ............ 710/39, 710/40, 52, 55, 56, 310
See application file for complete search history.

(56) References Cited

U.S. PATENT DOCUMENTS

| | | | | |
|---|---|---|---|---|
| 5,918,070 A * | 6/1999 | Moon et al. ............ 710/22 |
| 6,721,816 B1 * | 4/2004 | Magro et al. ............ 710/6 |
| 6,728,790 B2 * | 4/2004 | Ennis .................... 710/5 |
| 7,124,231 B1 * | 10/2006 | Garner et al. ............ 710/310 |
| 7,181,561 B2 * | 2/2007 | Barth et al. ............. 710/310 |
| 7,254,115 B1 * | 8/2007 | Lakhanpal et al. ....... 370/257 |
| 7,359,994 B1 * | 4/2008 | Lakhanpal et al. ....... 710/5 |
| 2003/0110340 A1 * | 6/2003 | Butler et al. ............ 710/305 |
| 2005/0289278 A1 * | 12/2005 | Tan et al. ............... 710/310 |

OTHER PUBLICATIONS

HyperTransport I/O Technology DirectPacket Specification, The HyperTransport Consortium, Jun. 2004.*

* cited by examiner

*Primary Examiner*—Khanh Dang
(74) *Attorney, Agent, or Firm*—Bever, Hoffman & Harms, LLP; Jeanette S. Harms

(57) ABSTRACT

A method and system for enforcing ordering rules for transactions are presented. The method and system generates transaction clump tags for each transaction before the transactions are stored in various type specific transaction queues. A transaction clump tag decoding unit decodes the transaction clump tag to recover temporal information regarding the transaction to avoid violations of the ordering rules.

32 Claims, 7 Drawing Sheets

RECONSTRUCTING TRANSACTION ORDER USING CLUMP TAGS

BACKGROUND OF THE INVENTION

1. Field of the Invention

The present invention relates to data systems. More specifically, the present invention relates to processing data transactions without violating ordering rules.

2. Discussion of Related Art

Modern data systems typically follow a producer-consumer model. FIG. 1 shows a data system 100 having a consumer 110, a data storage device 120, a bus 130, a bridge 140, a bus 150, a producer 160, a flag register 170, and a status register 180. In a producer-consumer model, producer 160 produces data and consumer 110 consumes (i.e., uses) the data. Specifically, when requested, producer 160 writes data into data storage device 120 through bus 150, bridge 140, and bus 130. After writing data into data storage device 120, producer 160 sets a flag in flag register 170 to indicate that the data has been written into data storage device 120. Consumer 110 waits until the flag is set in flag register 170 before using the data in data storage device 120. Consumer 110 also resets the flag in flag register 170 and writes a completion status code in status register 180 to indicate that consumer 110 has consumed the data. FIG. 1 shows one example of the producer-consumer model. In actual implementation, each component (i.e., consumer, producer, data storage device, flag register, and status register) of the producer-consumer model can be placed on either side of the bridge.

Data systems generally support multiple transaction types, such as posted transactions (e.g., data writes not requiring a response), non-posted transactions (e.g., data read requests), and completion transactions (e.g., data in response to data read requests. To handle the various transaction types, a transaction queue for each transaction type can be used. FIG. 2(a) shows a series of transactions 200, which includes (in order) a posted transaction P_01, a non-posted transaction NP_02, a completion transaction C_03, a posted transaction P_04, a non-posted transaction NP_05, a non-posted transaction NP_06, a posted transaction P_07, a completion transaction C_08, a posted transaction P_09, and a posted transaction P_10.

As illustrated in FIG. 2(b), the transactions of FIG. 2 are placed into type specific transaction queues in the order the transactions are received, such as, a posted transaction queue 210, a non-posted transaction queue 220, and a completion transaction queue 230. Specifically, posted transactions P_01, P_04, P_07, P_09, and P_10 are placed in posted transaction queue 210; non-posted transactions NP_02, NP_05, and NP_06 are placed in non-posted transaction queue 220; and completion transactions C_03 and C_08 are placed in completion transaction queue 230. Transactions of the same type are processed in the order received. However, transactions of different type are allowed to pass previously issued transaction of another type under certain ordering rules. For example, in one interpretation of the ordering rules of a PCI or PCI Express bus, posted transaction are allowed to pass previously received non-posted transactions and previously received completion transactions. Non-posted transactions are allowed to pass previously received completion instructions but not allowed to pass previously received posted transactions. Completion instructions are allowed to pass previously received non-posted transaction but not allowed to pass previously received posted instructions. These ordering rules are to prevent a consumer (in the producer-consumer model) from consuming data before a producer is finished and to prevent a producer from producing data before a consumer is finished. These ordering rules are summarized in Table 1. Table 1 indicates whether the transaction type in the first column may pass the previously issued transaction of the transaction types in the following columns.

TABLE 1

| Transaction | Posted | Non-Posted | Completion |
| --- | --- | --- | --- |
| POSTED | NO | YES | YES |
| NON-POSTED | NO | NO | YES |
| COMPLETION | NO | YES | YES |

Improved bandwidth is achieved when some transaction types are blocked for whatever reason but another transaction type can proceed without violating the ordering rules. For example, after posted transaction P_01 completes, if non-posted transaction NP_02 is blocked, completion transaction C_03 and posted transaction P_04 are allowed to proceed ahead of non-posted transaction NP_02. Thus, a blocked transaction does not necessarily halt usage of the data system. However, due to the ordering rules, blocked posted transactions may halt usage of the data system until the block is resolved.

For example, if posted transaction P_01 is blocked, no other transaction can be processed because neither non-posted transactions nor completion transactions are allowed to pass a previously received posted transaction. However, if posted transaction P_04 is blocked (after posted transaction P_01 has already been processed), non-posted transaction NP_02 and completion transaction C_03 can proceed. If posted transaction P_04 is still blocked after non-posted transaction NP_02 has been processed, non-posted transaction NP_05 is blocked by the ordering rules, because non-posted transaction NP_05 is not allowed to pass the previously received posted instruction P_04.

Thus, when processing the transaction, the information relating to the original order that the transactions were received is needed to follow the ordering rules. However, once the transactions have been separated into the various type-specific transaction queues, the original order of the transaction cannot be reconstructed from the transactions queues. However, the order of the transactions within each transaction type is preserved in the transaction queue. Conventionally, a transaction sequence number has been added to each transaction as the transaction is stored in the transaction queues. However, the transaction sequence number increases the size of the transaction queue by approximately 10%. Alternatively, an additional memory may be used to store the transaction sequence numbers. However, the additional memory increases the complexity of the data system.

Hence, there is a need for a method or system that can process transactions in the transaction queues in accordance with the ordering rules without requiring the increased queue size or additional complexity of using a transaction sequence number.

SUMMARY

Accordingly, the present invention provides a method and system for tagging transactions with a transaction clump tag as they are placed in the transaction queues and a method and system for decoding the transaction clump tags while processing the transaction to insure the ordering rules of the data system are not violated.

For example, in one embodiment of the present invention a transaction clump tagging unit embeds transaction clump tags in the data transactions as the data transactions are sorted into transaction type queues. Specifically, the transaction clump tagging unit assigns a first transaction clump tag having a second-transaction-type bit to a first data transaction of a first transaction type. The first data transaction is stored in a first transaction type queue. The transaction clump tagging unit also assigns a second transaction clump tag to a second data transaction of a second transaction type. The second transaction clump tag includes a second-transaction-type bit set to the inverse of the second-transaction-type bit of the first transaction clump tag. The transaction clump tagging unit also assigns a third transaction clump tag to a third data transaction of the first transaction type. The third transaction clump tag includes a second-type-transaction bit set equal to the inverse of the second-type-transaction bit of the second transaction clump tag.

For PCI systems and PCI express systems, the first transaction type can be posted transactions and the second transaction type can be non-posted transactions or completion transactions. Therefore, the transaction clump tagging unit assigns a first transaction clump tag having a non-posted bit to a first posted transaction. The first posted transaction is stored in a posted transaction queue. The transaction clump tagging unit also assigns a second transaction clump tag to a non-posted transaction. The second transaction clump tag includes a non-posted bit set to the inverse of the non-posted bit of the first transaction clump tag. The transaction clump tagging unit also assigns a third transaction clump tag to a second posted transaction. The third transaction clump tag includes a non-posted bit set equal to the inverse of the non-posted bit of the second transaction clump tag.

A transaction clump tag decoding unit decodes the transaction clump tag to insure the ordering rules are followed while processing the data transactions. Specifically, in one embodiment of the present invention the transaction clump tag decoding unit includes a counter that is incremented when the second transaction-type bit of a transaction clump tag of a previous first type data transaction is not equal to the second transaction-type bit of a transaction clump tag of a current first type data transaction. The counter is decremented when a second-transaction-type bit of a transaction clump tag of a previous second type data transaction is not equal to the second-transaction-type bit of a transaction clump tag of a current second type data transaction. The value of the counter determines whether the current second type data transaction should be blocked.

The present invention will be more fully understood in view of the following description and drawings.

DETAILED DESCRIPTION

As explained above, a sequence of transactions is divided into a plurality of transaction queues based on the types of transactions. However, when the transactions are processed the transaction ordering rules must be followed. In accordance with the present invention, a sequence of transactions is conceptually organized into different clumps. The transaction types within each clump can be processed in any order. However, transaction of the same type within a clump must be processed in the order that the transaction were received. Because transactions of the same type are stored in the same transaction queue, the order of transactions of each type is maintained by the structure of the transaction queues.

Figure 1:
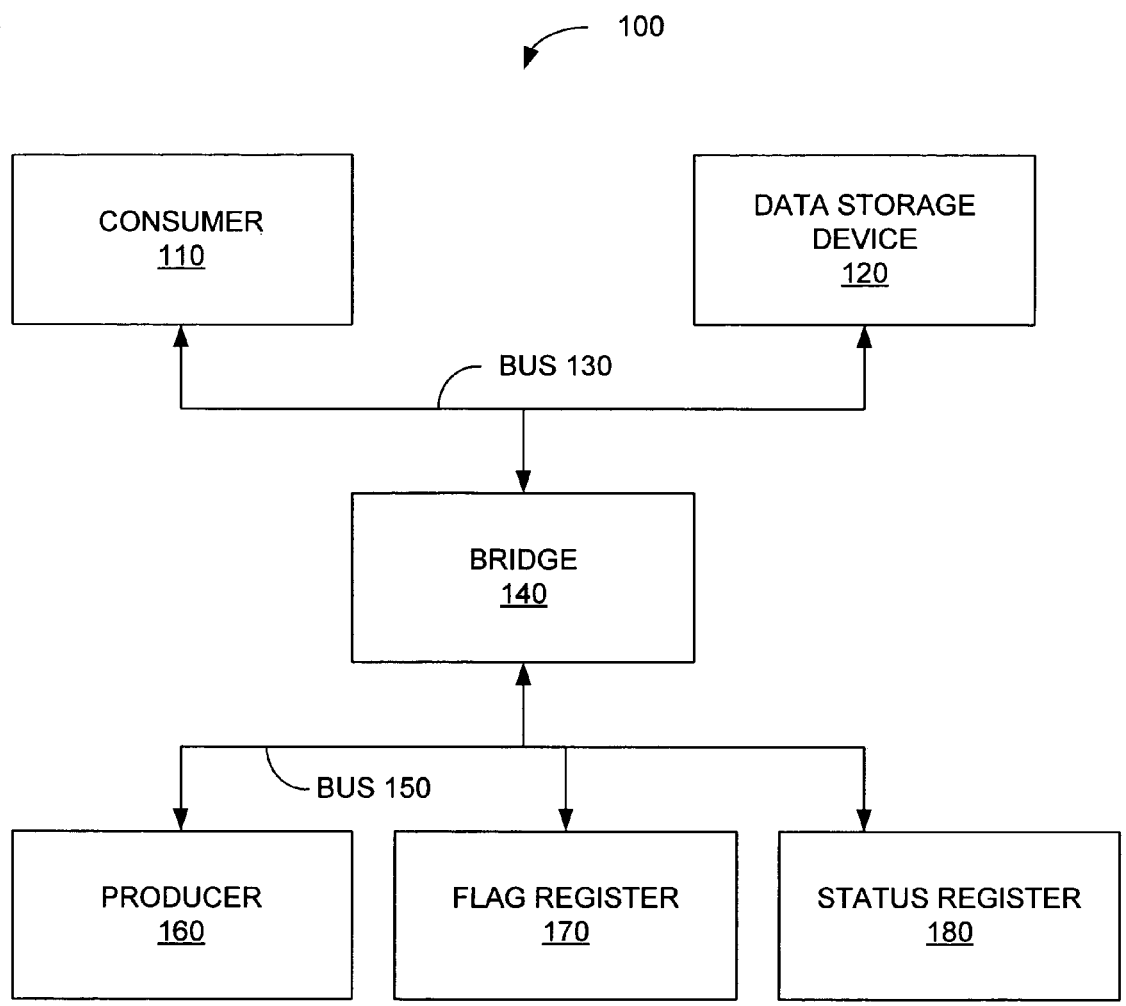
FIG. 1 is a model of a conventional data system.
Figure 2:
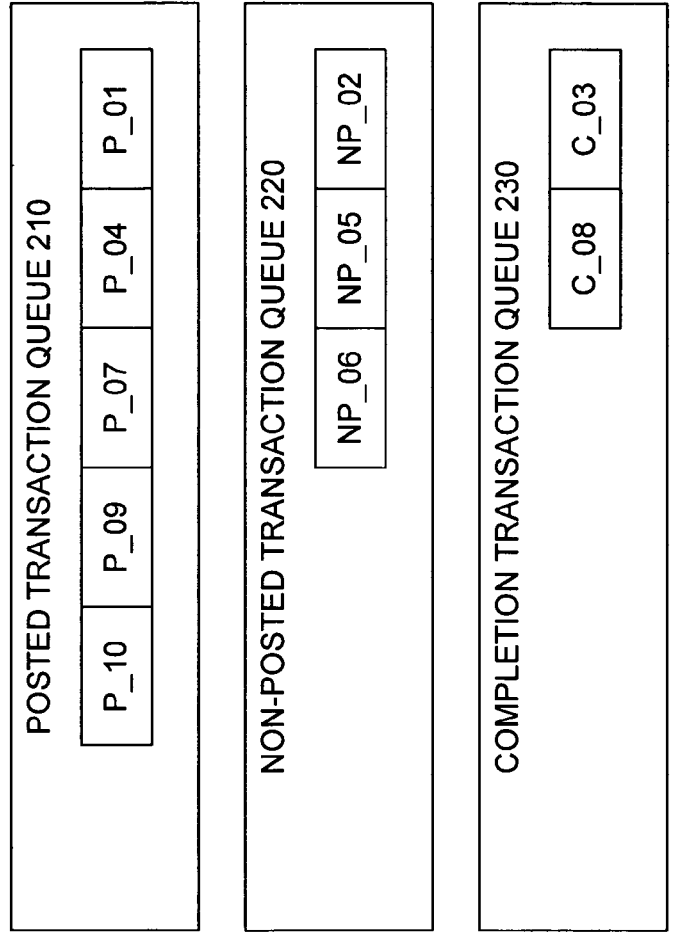
FIG. 2(a) is an illustration of a sequence of transactions.
FIG. 2(b) is a set of transaction queues used to store a sequence of transactions.
Figure 3:
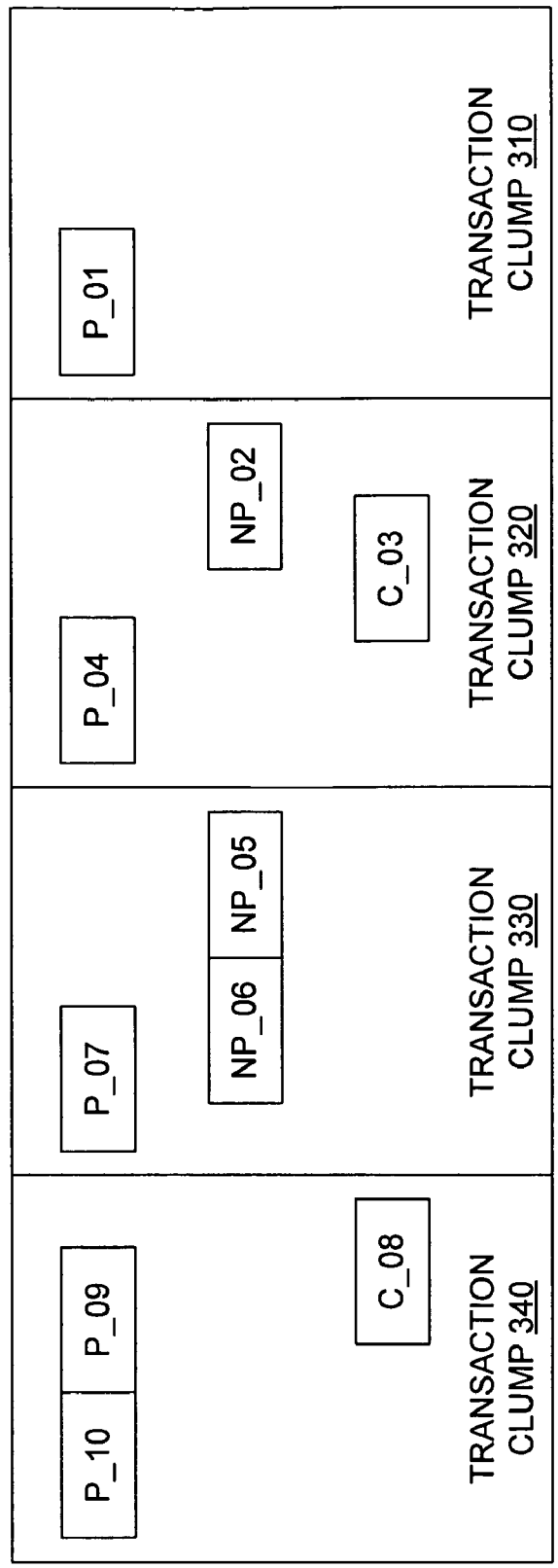
FIG. 3 is an illustration of transaction clumps in accordance with one embodiment of the present invention.

As shown in Table 1 above, no transaction can pass a previously received posted transaction. Therefore, posted transactions are used to define the end boundary of the transaction clumps. However, in most embodiments of the present invention groups of consecutive posted transaction are placed in the same clump. Because non-posted transaction can pass completion transactions and completion transactions can pass non-posted transaction, all non-posted transaction and completion transaction between two posted transaction are placed in the same clump as the posted transaction following the non-posted and completion transactions. FIG. 3 illustrates how sequence of transactions 200 is divided into transaction clumps 310, 320, 330, and 340, in accordance with one embodiment of the present invention. Specifically, transaction clump 310 includes only posted transaction P_01 because there were no non-posted transactions or completion transactions preceding posted transaction P_01. Transaction clump 320 includes non-posted transaction NP_02, completion transaction C_03, and posted transaction P_04. Transaction clump 330 includes non-posted transactions NP_05 and NP_06 and posted transaction P_07. Transaction clump 340 includes completion transaction C_08 and posted transaction P_09 and P_10. Other embodiments of the present invention may place posted transaction P_10 in a separate transaction clump.

As explained above, transactions are assigned into the same transaction clump so that the ordering rules allow any transaction in the clump to be processed ahead of any other transaction in the transaction clump of a different transaction type. For example in transaction clump 320, posted transaction P_04 can be processed before non-posted transaction NP_02 and completion transaction C_03 because the ordering rules allows a posted transaction to pass previously received non-posted transaction and to pass previously received completion transaction. Non-posted transaction NP_02 can be processed before posted transaction P_04 and completion transaction C_03 because non-posted transaction NP_02 was received before both posted transaction P_04 and completion transaction C_03. Furthermore, even if completion transaction C_03 was received before non-posted transaction NP_02, non-posted transaction NP_02 could be processed before completion transaction C_03 because the ordering rules allows a non-posted transaction to pass previously received completion transactions. Completion transaction C_03 can be processed before posted transaction P_04 because completion transaction C_03 was received before posted transaction P_04. Completion transaction C_03 can be processed before non-posted transaction NP_02 because the ordering rules allows a completion transaction to pass a previously received non-posted transaction. Posted transaction P_01 is not included in transaction clump 320 because non-posted transaction NP_02 and completion transaction C_03 cannot be processed before posted transaction P_01 because the ordering rules forbid non-posted transaction and completion transactions from passing previously received posted transaction. Non-posted transaction NP_05 is excluded from transaction clump 320 because the non-posted transaction NP_05 cannot be processed before posted transaction P_04.

In transaction clump 330, posted transaction P_07 can be processed before non-posted transactions NP_05 and NP_06 because the ordering rules allow a posted transaction to pass previously received non-posted transactions. Because non-posted transaction NP_05 and NP_06 were received before posted transaction P_07, non-posted transactions NP_05 and NP_06 can be processed before posted transaction P_07. With strictly ordered queues, non-posted transaction NP_05 is processed before non-posted transaction NP_06. However, some embodiments of the present invention may use buffers that allow out of order processing of non-posted transactions.

In transaction clump 340, posted transactions P_09 and P_10 can be processed before completion transaction C_08 because the ordering rules allow a posted transaction to pass previously received completion transactions. However, posted transaction P_09 is processed before posted transaction P_10 based on the interpretation of the ordering rules given in Table 1. However, in some embodiments of the present invention, posted transactions are allowed to pass previously received posted transaction under "relaxed" ordering rules. Because completion transaction C_08 was received before posted transactions P_09 and P_10, completion transaction C_08 can be processed before posted transactions P_09 and P_10.

Once the transaction are placed into the appropriate transaction clumps, determining whether a transaction is blocked by the ordering rules is relatively straightforward. Specifically, if a posted transaction of a preceding transaction clump has not been processed, transactions in a following transaction clump are blocked.

A simple way to track transaction clumps would be to assign a sequential transaction clump identification to each transaction clump. As each transaction is entered into a transaction queue the transaction clump identification is stored with each transaction. If the transaction clump identification of a non-posted transaction is less than or equal to the transaction clump identification of the oldest unprocessed posted transaction in the posted transaction queue or if the posted transaction queue is empty, then the non-posted transaction is not blocked by the ordering rules. Similarly, if the transaction clump identification of a completion transaction is less than or equal to the transaction clump identification of the oldest unprocessed posted transaction in the posted transaction queue or if the posted transaction queue is empty, then the completion transaction is not blocked by the ordering rules. However, while the number of transaction clumps is less than the number of transactions, the number of bits required for the transaction clump identification is not significantly less than the number of bits required for a sequential transaction identification. Therefore, other embodiments of the present invention use a small transaction clump tag that is stored with or in each transaction. The transaction clump tags can be decoded to determine whether a transaction is blocked by the ordering rules.

Figure 4:
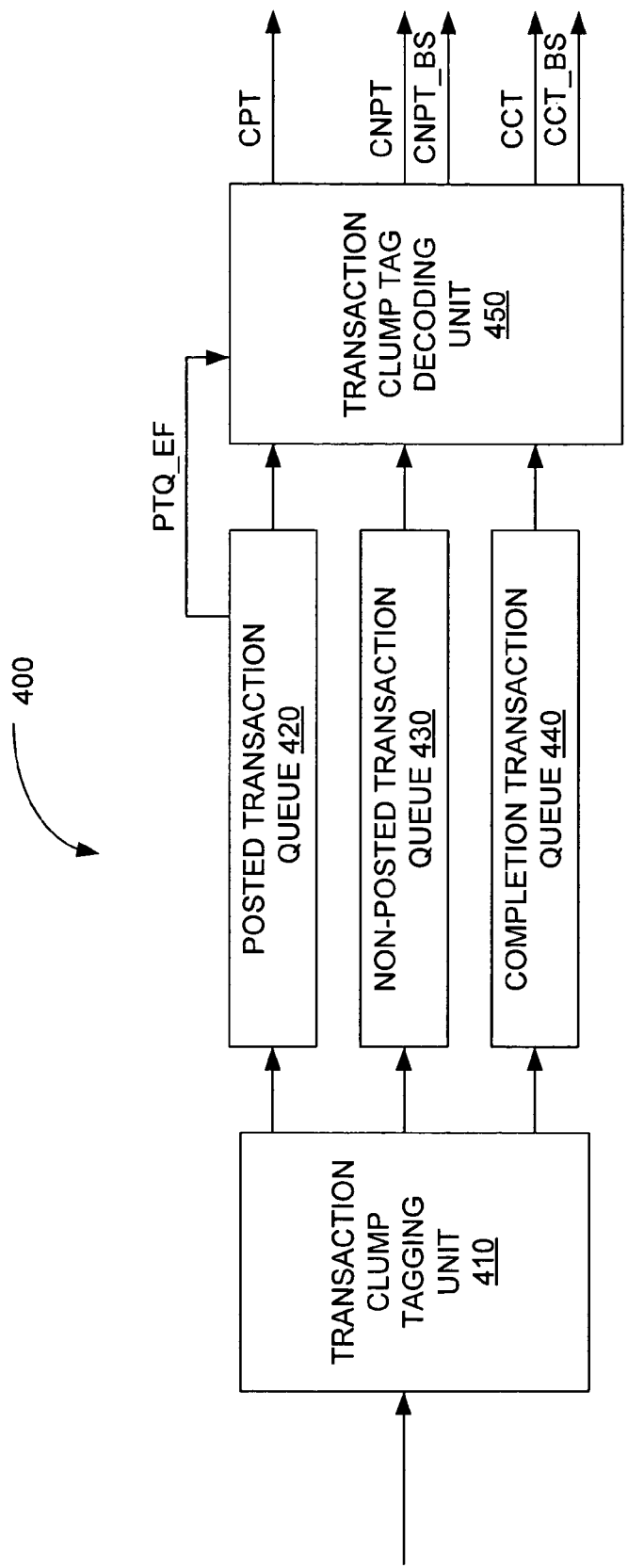
FIG. 4 is a block diagram of a transaction ordering system in accordance with one embodiment of the present invention.

FIG. 4 shows a block diagram of a transaction clump tagging and decoding system 400 in accordance with one embodiment of the present invention. Transaction clump tagging and decoding system 400 includes a transaction clump tagging unit 410, a posted transaction queue 420, a non-posted transaction queue 430, a completion transaction queue 440, and a transaction clump tag decoding unit 450. Transaction clump tagging unit 410 receives incoming transaction, generates a clump tag for each transaction and places the transaction and the transaction clump tag into the appropriate transaction queue. In some embodiments of the present invention, the clump tags are embedded in unused (i.e., reserved) bits of the transactions. An embodiment of transaction clump tagging unit 410 is described below. Posted transaction queue 420 stores incoming posted transactions, non-posted transaction queue 430 stores non-posted transactions, and completion transaction queue 440 stores completion transactions. Each transaction queue works like a first-in-first-out (FIFO) buffer. Posted transaction queue 420 provides a posted transaction queue empty flag PTQ_EF to transaction clump tag decoding unit 450. Posted transaction queue empty flag is driven to an empty logic level (e.g., logic high) when posted transaction queue 420 is empty and driven to a non-empty logic level (e.g., logic low) when posted transaction queue 420 contains a posted transaction.

Transaction clump tag decoding unit 450 buffers the current (i.e., oldest unprocessed) transaction from each transaction queue and decodes the transaction clump tags from the current transactions to determine which transactions can be processed without violating the ordering rules. Thus, transaction clump tag decoding unit 450 provides current posted transaction CPT, current non-posted transaction CNPT, current completion transaction CCT, a current non-posted transaction blocked signal CNPT_BS, and a current completion transaction blocked signal CCT_BS. Current non-posted transaction blocked signal CNPT_BS indicates whether the current non-posted transaction is blocked by the ordering rules. Specifically, current non-posted transaction blocked signal CNPT_BS is driven to a blocked state (typically logic high) when the current non-posted transaction is blocked by the ordering rules and driven to a not blocked state (typically logic low) when the current non-posted transaction is not blocked by the ordering rules. Similarly, current completion transaction blocked signal CCT_BS indicates whether the current completion transaction is blocked by the ordering rules. In embodiments of the present invention that embed transaction clump tags in the transactions, transaction clump tag decoding unit 450 also modifies the current transaction to remove the transaction clump tags. An embodiment of transaction clump tag decoding unit 450 is described below.

Figure 5:
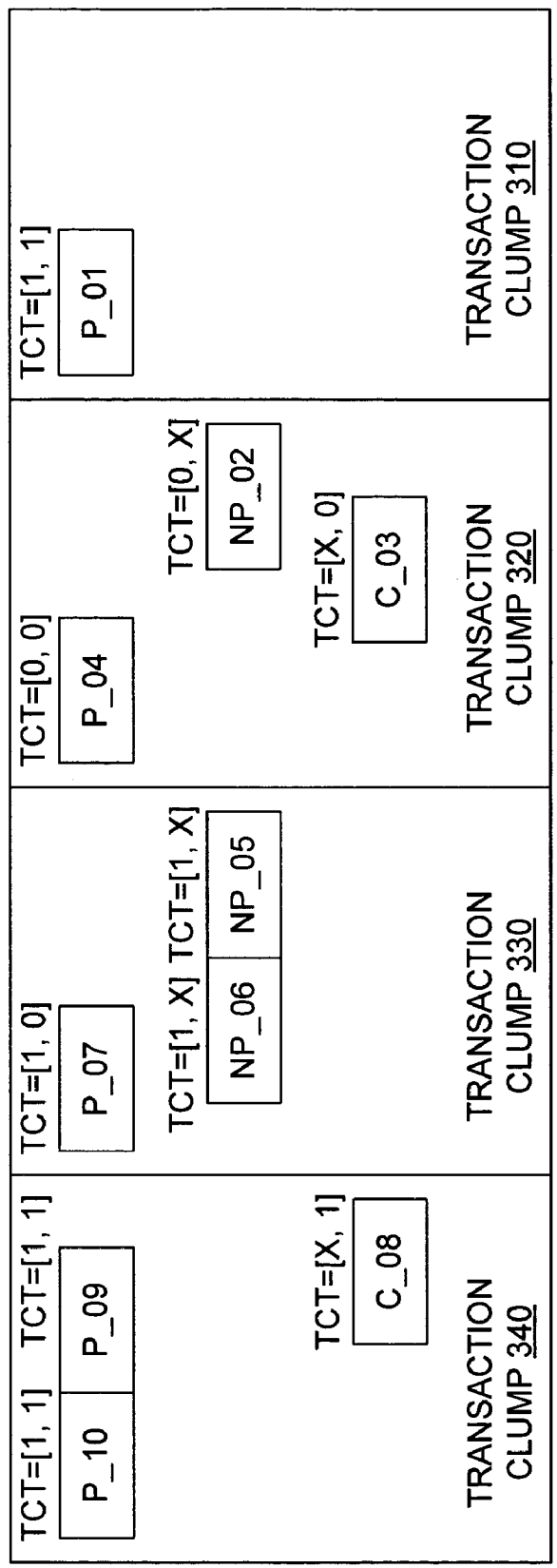
FIG. 5 is an illustration of transaction clumps with transaction clump tags in accordance with one embodiment of the present invention.

FIG. 5 illustrates the generation of transaction clump tags in accordance with one embodiment of the present invention. Specifically, FIG. 5 shows the transactions from FIG. 3 with the corresponding transaction clump tags (TCT) for each transaction. For posted transactions, a 2 bit transaction clump tag [b2,b1] is used, in which the first bit b1 is a completion bit and the second bit b2 is a non-posted bit. For non-posted transaction and completion transactions, only a single bit transaction clump tag is required. However for consistency, the embodiments of FIGS. 4, 5, 6, and 7 use two-bit transaction clump tags, having a non-posted bit (the second bit) and a completion bit (the first bit), for all transactions. Thus, in FIG. 5, transaction clump tags for non-posted transactions only make use of the non-posted bit and the completion bit is shown with an "X" signifying a don't care condition (i.e., the completion bit can be logic 0 or logic 1 without changing the behavior of the system). Conversely, transaction clump tags for completion transactions only make use of the completion bit and the non-posted bit is shown with an "X".

For clarity, the embodiment of FIG. 5 defines the transaction clump tag of the first posted transaction to be [1,1]. One skilled in the art can adapt the principles described herein to other defined initial values. Thus, posted transaction P_01 is shown with a transaction clump tag equal to [1,1]. If posted transaction P_01 were preceded by a non-posted transaction, the transaction clump tag of the non-posted transaction would be equal to [1,X]. Similarly, if posted transaction P_01 were preceded by a completion transaction, the transaction clump tag of the non-posted transaction would be equal to [X,1].

After the transaction clump tags of the transactions in the initial clump (i.e., transaction clump 310) are defined as explained above, the transaction clump tags of following clumps follow a specific set of rules. Specifically, the non-posted bit of the transaction clump tag of a posted transaction is equal to the non-posted bit of the transaction clump tag of the most recent non-posted transaction. Similarly, the completion bit of the transaction clump tag of a posted transaction is equal to the completion bit of the transaction clump tag of the most recent completion transaction. The non-posted bit of the transaction clump tag of a non-posted transaction is equal to the inverse of the non-posted bit of the transaction clump tag of the most recent posted transaction. Similarly, the completion bit of the transaction clump tag of a completion transaction is equal to the inverse of the completion bit of the transaction clump tag of the most recent posted transaction. As explained above the completion bit of the transaction clump tag of a non-posted transaction and the non-posted bit of a completion transaction are irrelevant and marked with "X", which signifies a "don't care" condition.

Applying the rules above, the non-posted bit of the transaction clump tag for non-posted transaction NP_02 is equal to the inverse of the non-posted bit of the transaction clump tag of the most recent posted transaction, which is posted transaction P_01. The completion bit of the transaction clump tag for non-posted transaction NP_02 is irrelevant. Thus the transaction clump tag of non-posted transaction NP_02 is equal to [0,X]. The non-posted bit of the transaction clump tag of completion transaction C_03 is irrelevant. The completion bit of the transaction clump tag of completion transaction C_03 is equal to the inverse of the completion bit of the transaction clump tag of the most recent posted transaction, which is posted transaction P_01. Thus, the transaction clump tag of completion transaction C_03 is equal to [X,0]. The non-posted bit of the transaction clump tag of posted transaction P_04 is equal to the non-posted bit of the transaction clump tag of the most recent non-posted transaction, which is non-posted transaction NP_02. The completion bit of the transaction clump tag of posted transaction P_04 is equal to the completion bit of the transaction clump tag of the most recent completion transaction, which is completion transaction C_03. Thus, the transaction clump tag of posted transaction P_04 is equal to [0,0].

The non-posted bit of the transaction clump tag for non-posted transaction NP_05 is equal to the inverse of the non-posted bit of the transaction clump tag of posted transaction P_04. The completion bit of the transaction clump tag for non-posted transaction NP_05 is irrelevant. Thus, the transaction clump tag of non-posted transaction NP_05 is equal to [1,X]. The non-posted bit of the transaction clump tag for non-posted transaction NP_06 is equal to the inverse of the non-posted bit of the transaction clump tag of posted transaction P_04. The completion bit of the transaction clump tag for non-posted transaction NP_06 is irrelevant. Thus, the transaction clump tag of non-posted transaction NP_06 is equal to [1,X]. As illustrated by the transaction clump tags of non-posted transactions NP_05 and NP_06, the transaction clump tags of all transactions of the same type within a transaction clump are the same. The non-posted bit of the transaction clump tag of posted transaction P_07 is equal to the non-posted bit of the transaction clump tag of non-posted transaction NP_06. The completion bit of the transaction clump tag of posted transaction P_07 is equal to the completion bit of the transaction clump tag of completion transaction C_03. Thus, the transaction clump tag of posted transaction P_07 is equal to [1,0].

The completion bit of the transaction clump tag for completion transaction C_08 is equal to the inverse of the completion bit of the transaction clump tag of posted transaction P_07. The non-posted bit of the transaction clump tag for completion transaction C_08 is irrelevant. Thus, the transaction clump tag of completion transaction C_08 is equal to [X,1]. The non-posted bit of the transaction clump tag of posted transaction P_09 is equal to the non-posted bit of the transaction clump tag of non-posted transaction NP_06. The completion bit of the transaction clump tag of posted transaction P_09 is equal to the completion bit of the transaction clump tag of completion transaction C_08. Thus, the transaction clump tag of posted transaction P_09 is equal to [1,1]. The non-posted bit of the transaction clump tag of posted transaction P_10 is equal to the non-posted bit of the transaction clump tag of non-posted transaction NP_06. The completion bit of the transaction clump tag of posted transaction P_10 is equal to the completion bit of the transaction clump tag of completion transaction C_08. Thus, the transaction clump tag of posted transaction P_10 is equal to [1,1].

Figure 6:
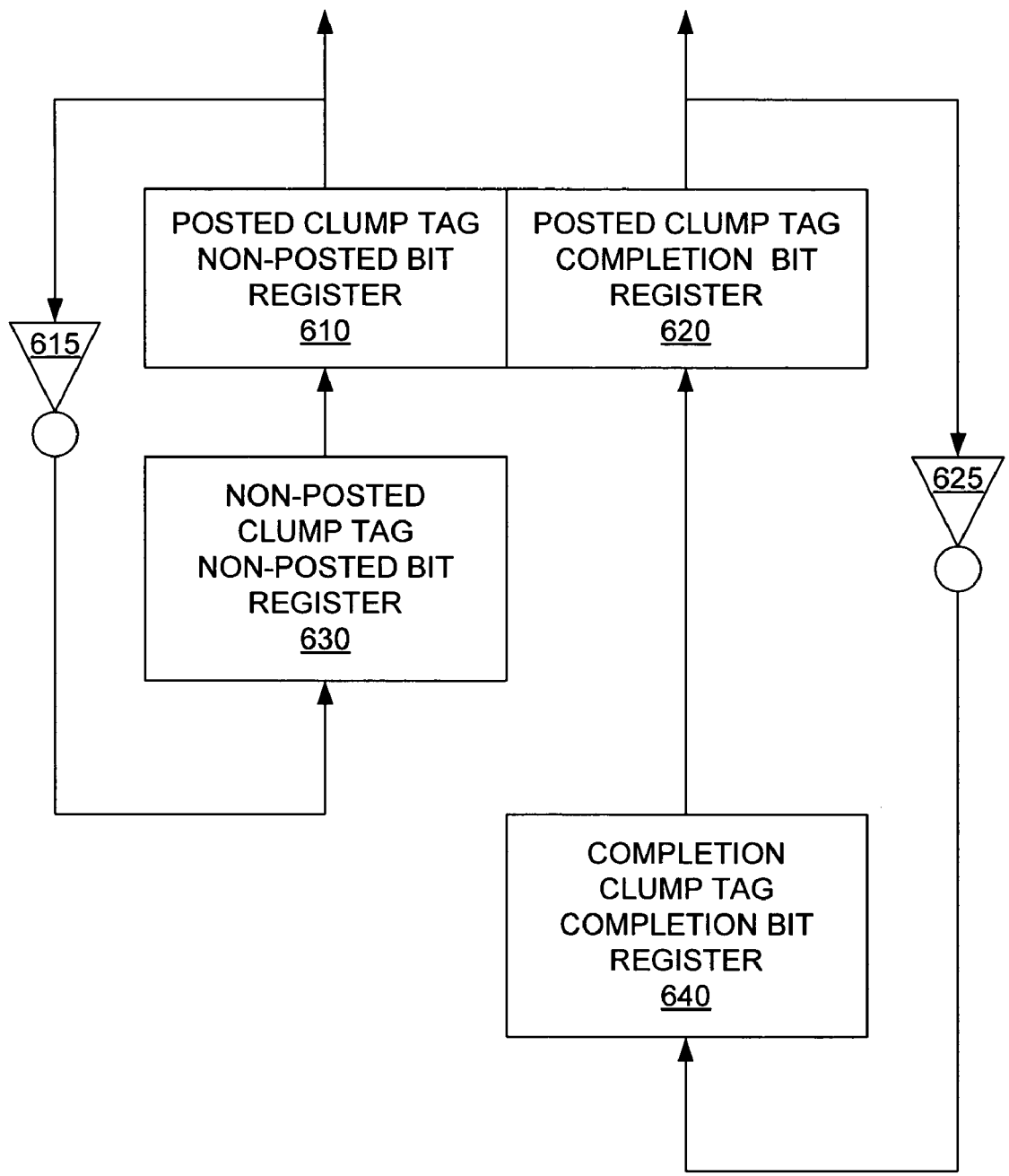
FIG. 6 is block diagram transaction processing system in accordance with one embodiment of the present invention.

FIG. 6 is a circuit that can be used to generate the transaction clump tags. The embodiment of FIG. 6 includes a posted clump tag non-posted bit register 610, an inverter 615, a posted clump tag completion bit register 620, an inverter 625, a non-posted clump tag non-posted bit register 630, and a completion clump tag completion bit register 640. Posted clump tag non-posted bit register 610 and posted clump tag completion bit register 620 contain the non-posted bit and completion bit, respectively, of the transaction clump tag of the most recent posted transaction. Non-posted clump tag non-posted bit register 630 contains the non-posted bit of the transaction clump tag of the most recent non-posted transaction. Completion clump tag completion bit register 640 contains the completion bit of the transaction clump tag of the most recent completion transaction. Posted clump tag non-posted bit register 610 and posted clump tag completion bit register 620 are initialized to logic 0. Non-posted clump tag non-posted bit register 630 and completion clump tag completion bit register 640 are initialized to logic 1.

When a new posted transaction is received, posted clump tag non-posted bit register 610 is updated with the bit value from non-posted clump tag non-posted bit register 630 and posted clump tag completion bit register 620 is updated with the bit value from completion clump tag completion bit register 640. The updated values in posted clump tag non-posted bit register 610 and posted clump tag completion bit register 620 are used as the non-posted bit and completion bit of the transaction clump tag of the new posted transaction. When a new non-posted transaction is received, non-posted clump tag non-posted-bit register 630 is updated with the value from posted clump tag non-posted bit register 610 inverted through inverter 615. The updated value in non-posted clump tag non-posted bit register 630 is used as the non-posted bit of the transaction clump tag of the new non-posted transaction. When a new completion transaction is received, completion clump tag completion bit register 640 is updated with the value from posted clump tag completion bit register 620 inverted through inverter 625. The updated value in completion clump tag completion bit register 640 is used as the completion bit of the transaction clump tag of the new completion transaction.

A careful review of the transaction clump tag reveals fundamental characteristics of the transaction clump tags that can be used to decode the transaction clump tags to enforce the ordering rules. Specifically, if one or more non-posted transactions exists between a first posted transaction and the next posted transaction, the non-posted bit of the transaction clump tag of the next posted transaction is the inverse of the non-posted bit of the transaction clump tag of the first posted transaction. Similarly, if one or more completion transactions exist between a first posted transaction and the next posted transaction, the completion bit of the transaction clump tag of the next posted transaction is the inverse of the completion bit of the transaction clump tag of the first posted transaction. Furthermore, if one or more posted transactions exist between a first non-posted transaction and the next non-posted transaction, the non-posted bit of the transaction clump tag of the next non-posted transaction is the inverse of the non-posted bit of the transaction clump tag of the first non-posted transaction. Similarly, if one or more posted transactions exist between a first completion transaction and the next completion transaction, the completion bit of the transaction clump tag of the next completion transaction is the inverse of the completion bit of the transaction clump tag of the first completion transaction.

The transition of the appropriate bits between transactions is used to implement the ordering rules. Specifically, the transitions of the non-posted bit of the transaction clump tags of the posted transactions are used to increment a first counter. The first counter is decremented by transitions of the non-posted bit of the transaction clump tags of the non-posted transactions. The value of the first counter along with some other information is sufficient to implement the ordering rules for non-posted transactions as explained in greater detail below. Similarly a second counter that is incremented by the transitions of the completion bit of the transaction clump tags of the posted transaction and decremented by the transitions of the completion bit of the transaction clump tags of the completion transactions is used to implement the ordering rules for completion transactions, as explained in more detail below.

Figure 7:
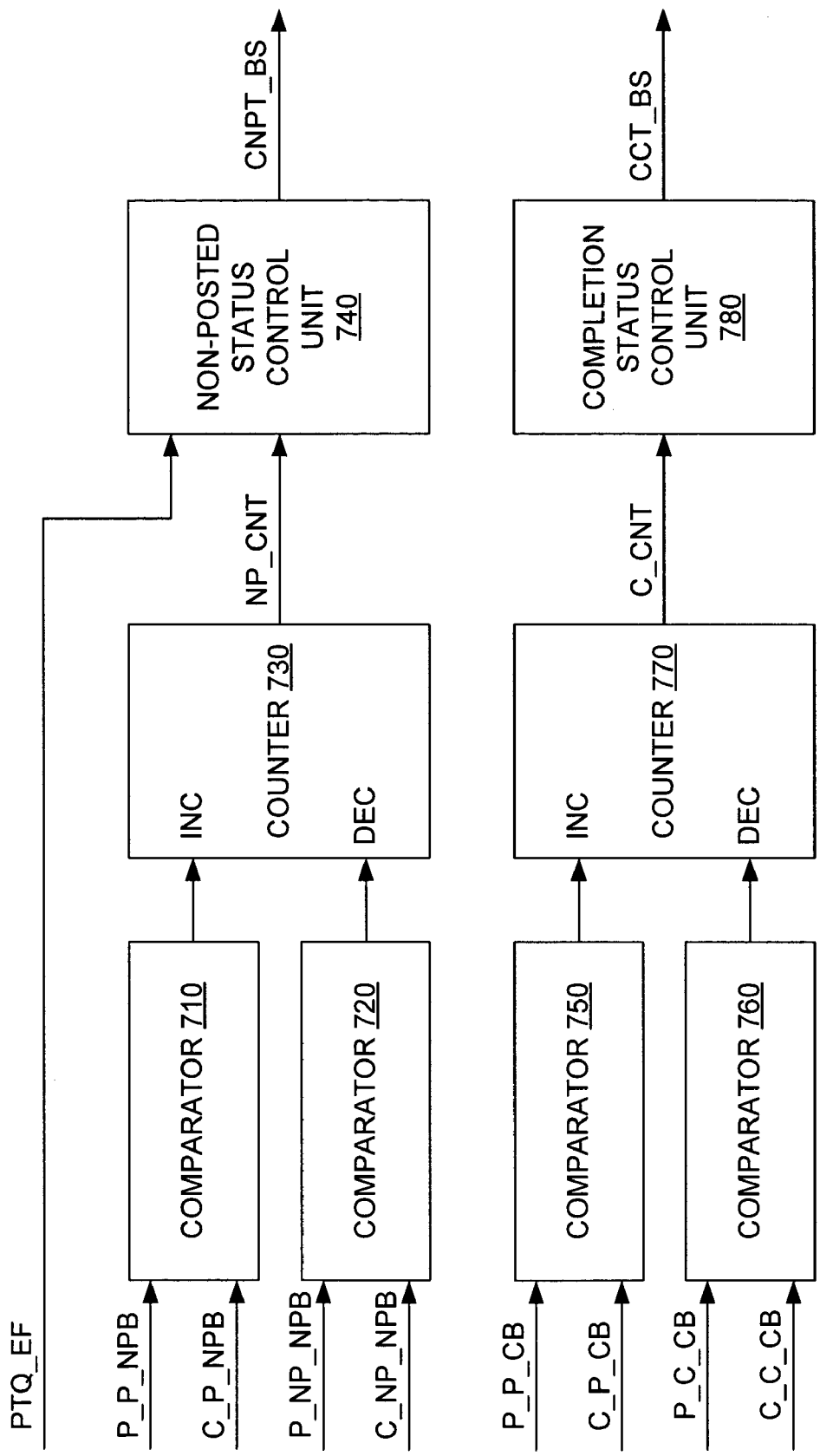
FIG. 7 is block diagram of a transaction clump tag unit in accordance with the present invention.

FIG. 7 shows one embodiment of transaction clump tag decoding unit 450 having comparators 710, 720, 750 and 760, counters 730 and 770, a non-posted status control unit 740, and a non-posted status control unit 780. Comparator 710 compares a previous posted transaction clump tag non-posted bit P_P_NPB (i.e., the non-posted bit of the transaction clump tag of the previous posted transaction) with a current posted transaction clump tag non-posted bit C_P_NPB (i.e. the non-posted bit of the transaction clump tag of the current posted transaction). If previous posted transaction clump tag non-posted bit P_P_NPB is not equal to current posted transaction clump tag non-posted bit C_P_NPB then comparator 710 causes counter 730 to increment by one. If previous posted transaction clump tag non-posted bit P_P_NPB is equal to current posted transaction clump tag non-posted bit C_P_NPB then comparator 710 does not cause counter 730 to increment by one. Due to the initial values used above with regards to the transaction clump tags, previous posted transaction clump tag non-posted bit P_P_NPB is initialized to a value of logic 0. Previous posted transaction clump tag non-posted bit P_P_NPB is updated to equal the current posted transaction clump tag non-posted bit C_P_NPB when the current posted transaction is processed and removed from transaction clump tag decoding unit 450. The current posted transaction clump tag non-posted bit C_P_NPB is updated when a new current posted-transaction is brought into transaction clump tag decoding unit 450. Counter 730 is incremented at most once for each current posted transaction.

Comparator 720 compares a previous non-posted transaction clump tag non-posted bit P_NP_NPB (i.e., the non-posted bit of the transaction clump tag of the previous non-posted transaction) with a current non-posted transaction clump tag non-posted bit C_NP_NPB (i.e. the non-posted bit of the transaction clump tag of the current non-posted transaction). If previous non-posted transaction clump tag non-posted bit P_NP_NPB is not equal to current non-posted transaction clump tag non-posted bit C_NP_NPB then comparator 720 causes counter 730 to decrement by one. If previous non-posted transaction clump tag non-posted bit P_NP_NPB is equal to current non-posted transaction clump tag non-posted bit C_NP_NPB then comparator 720 does not cause counter 730 to decrement by one. Due to the initial values used above with regards to the transaction clump tags, previous non-posted transaction clump tag non-posted bit P_NP_NPB is initialized to a value of logic 0. Previous non-posted transaction clump tag non-posted bit P_NP_NPB is updated to equal the current non-posted transaction clump tag non-posted bit C_NP_NPB when the current non-posted transaction is processed and removed from transaction clump tag decoding unit 450. Current non-posted transaction clump tag non-posted bit C_NP_NPB is updated when a new current non-posted-transaction is brought into transaction clump tag decoding unit 450. First counter 730 is decremented at most once for each current non-posted transaction.

Counter 730 is initialized at an initial count value ICV, which is large enough to avoid counter 730 from being decremented to a negative value. In one embodiment of the present invention, initial count value ICV is equal to two. Counter 730 provides a non-posted count NP_CNT to non-posted status control unit 740, which generates current non-posted transaction blocked signal CNPT_BS. When non-posted count NP_CNT is greater than or equal to initial count value ICV, the current non-posted transaction is not blocked and non-posted status control unit 740 drives current non-posted transaction blocked signal to a not blocked logic level. When non-posted count NP_CNT is equal to initial count value ICV minus one (i.e., ICV−1), and there are no received but unprocessed posted transactions, i.e. there is no current posted transaction and no posted transactions in posted transaction queue 420 as indicated by posted transaction queue empty flag PTQ_EF being at an empty logic level, then the current non-posted transaction is not blocked and non-posted status control unit 740 drives current non-posted transaction blocked signal to a not blocked logic level. However, when non-posted count NP_CNT is equal to initial count value ICV minus one (i.e., ICV−1), and there are received but unprocessed posted transaction, i.e. posted transactions in posted transaction queue 420 as indicated by posted transaction queue empty flag being at a non-empty logic level or there is a current posted transaction, then the current non-posted transaction is blocked and non-posted status control unit 740 drives current non-posted transaction blocked signal to a blocked logic level. When non-posted count NP_CNT is equal to initial count value ICV minus two (i.e., ICV−2), then the current non-posted transaction is blocked and non-posted status control unit 740 drives current non-posted transaction blocked signal to a blocked logic level. With the transaction clump tag scheme described above, non-posted count NP_CNT should not be less than initial count value ICV minus two, thus an error condition would exist if non-posted count NP_CNT is less than initial count value ICV minus two.

Comparator 750 compares a previous posted transaction clump tag completion bit P_P_CB (i.e., the completion bit of the transaction clump tag of the previous posted transaction) with a current posted transaction clump tag completion bit C_P_CB (i.e. the completion bit of the transaction clump tag of the current posted transaction). If previous posted transaction clump tag completion bit P_P_CB is not equal to current posted transaction clump tag completion bit C_P_CB then comparator 750 causes counter 770 to increment by one. If previous posted transaction clump tag completion bit P_P_CB is equal to current posted transaction clump tag completion bit C_P_CB then comparator 750 does not cause counter 770 to increment by one. Due to the initial values used above with regards to the transaction clump tags, previous posted transaction clump tag completion bit P_P_CB is initialized to a value of logic 0. Previous posted transaction clump tag completion bit P_P_CB is updated to equal the current posted transaction clump tag completion bit C_P_CB when the current posted transaction is processed and removed from transaction clump tag decoding unit 450. The current posted transaction clump tag completion bit C_P_CB is updated when a new current posted-transaction is brought into transaction clump tag decoding unit 450. Counter 770 is incremented at most once for each current posted transaction.

Comparator 760 compares a previous completion transaction clump tag completion bit P_C_CB (i.e., the completion bit of the transaction clump tag of the previous completion transaction) with a current completion transaction clump tag completion bit C_C_CB (i.e. the completion bit of the transaction clump tag of the current completion transaction). If previous completion transaction clump tag completion bit P_C_CB is not equal to current completion transaction clump tag completion bit C_C_CB then comparator 760 causes counter 770 to decrement by one. If previous completion transaction clump tag completion bit P_C_CB is equal to current completion transaction clump tag completion bit C_C_CB then comparator 760 does not cause counter 770 to decrement by one. Due to the initial values used above with regards to the transaction clump tags, previous completion transaction clump tag completion bit P_C_CB is initialized to a value of logic 0. Previous completion transaction clump tag completion bit P_C_CB is updated to equal the current completion transaction clump tag completion bit C_C_CB when the current completion transaction is processed and removed from transaction clump tag decoding unit 450. Current completion transaction clump tag completion bit C_C_CB is updated when a new current completion-transaction is brought into transaction clump tag decoding unit 450. Counter 770 is decremented at most once for each current completion transaction.

Counter 770 is initialized at an initial count value ICV which is large enough to avoid counter 770 from being decremented to a negative value. In one embodiment of the present invention, initial count value ICV is equal to two. Counter 770 provides a completion count C_CNT to completion status control unit 780, which generates current completion transaction blocked signal CCT_BS. When completion count C_CNT is greater than or equal to initial count value ICV, the current completion transaction is not blocked and completion status control unit 780 drives current completion transaction blocked signal CCT_BS to a not blocked logic level. When completion count C_CNT is equal to initial count value ICV minus one (i.e., ICV−1) and there are no received but unprocessed posted transactions, i.e. there is no current posted transaction and no posted transactions are in posted transaction queue 420 as indicated by posted transaction queue empty flag PTQ_EF being at an empty logic level, then the current completion transaction is not blocked and completion status control unit 780 drives current completion transaction blocked signal to a not blocked logic level. However, when completion count C_CNT is equal to initial count value ICV minus one (i.e., ICV−1), and there are received but unprocessed posted transaction, i.e., posted transactions in posted transaction queue 420 as indicated by posted transaction queue empty flag being at a non-empty logic level or there is a current posted transaction, then the current completion transaction is blocked and completion status control unit 780 drives current completion transaction blocked signal to a blocked logic level. When completion count C_CNT is equal to initial count value ICV minus two (i.e., ICV−2), then the current completion transaction is blocked and completion status control unit 780 drives current completion transaction blocked signal to a blocked logic level. With the transaction clump tag scheme described above, completion count C_CNT should not be less than initial count value ICV minus two, thus an error condition would exist if completion count C_CNT is less than initial count value ICV minus two.

As stated above, some embodiments of the present invention embed the transaction clump tags within the transactions rather than requiring additional memory space in the transaction queues. For example, in an embodiment of the present invention for use with the PCI Express bus, the transaction clump tags are placed in two of the eight reserved bits of the PCI transaction header. Because the PCI Express standard defines the value of the reserved bits to be zero, transaction clump tag decoding unit 450 resets the reserved bits that were used for the transaction clump tag to zero as current transactions are processed.

In the various embodiments of the present invention, novel structures have been described for enforcing ordering rules for transactions. The various embodiments of the structures and methods of this invention that are described above are illustrative only of the principles of this invention and are not intended to limit the scope of the invention to the particular embodiments described. For example, in view of this disclosure those skilled in the art can define other ordering rules, transaction clump tags, transaction clump tagging units, transaction clump tag decoding units, non-posted status control units, completion status control units, and use these alternative features to create a method, circuit, or system according to the principles of this invention. Thus, the invention is limited only by the following claims.

What is claimed is:

1. A method of processing a plurality of data transaction, wherein the plurality of data transaction can be of a first transaction type or a second transaction type, the method comprising:
   initializing a first counter to an initial count value;
   incrementing the first counter when a second-transaction-type bit of a transaction clump tag of a previous first type data transaction is not equal to a second-transaction-type bit of a transaction clump tag of a current first type data transaction; and
   decrementing the first counter when a second-transaction-type bit of a transaction clump tag of a previous second type data transaction is not equal to a second-transaction-type bit of a transaction clump tag of a current second type data transaction.

2. The method of claim 1, further comprising blocking the current second type data transaction when the first counter is at a value equal to the initial count value minus 1 and there are received but unprocessed first type data transactions.

3. The method of claim 2, wherein the blocking the current second type data transaction when the first counter is at a value equal to the initial count value minus 1 and there are received but unprocessed first type data transactions further comprises driving a second transaction type blocking signal to a blocked logic state.

4. The method of claim 2, further comprising blocking the current second type data transaction when the first counter is at a value equal to the initial count value minus 2.

5. The method of claim 4, wherein the blocking the current second type data transaction when the first counter is at a value equal to the initial count value minus 2, further comprises driving a second transaction type blocking signal to a blocked logic state.

6. The method of claim 1, further comprising:
  initializing a second counter to the initial count value;
  incrementing the second counter when a third-transaction-type bit of a transaction clump tag of a previous first type data transaction is not equal to a third-transaction-type bit of a transaction clump tag of a current first type data transaction; and
  decrementing the second counter when a third-transaction-type bit of a transaction clump tag of a previous third type data transaction is not equal to a third-transaction-type bit of a transaction clump tag of a current third type data transaction.

7. The method of claim 6, further comprising blocking the current third type data transaction when the second counter is at a value equal to the initial count value minus 1 and there are received but unprocessed first type data transactions.

8. The method of claim 7, wherein the blocking the current third type data transaction when the second counter is at a value equal to the initial count value minus 1 and there are received but unprocessed first type data transactions, further comprises driving a third-transaction-type blocking signal to a blocked logic state.

9. The method of claim 6, further comprising blocking the current third type data transaction when the second counter is at a value equal to the initial count value minus 2.

10. The method of claim 9, wherein the blocking the current third type data transaction when the second counter is at a value equal to the initial count value minus 2, further comprises driving a third-transaction-type blocking signal to a blocked logic state.

11. The method of claim 1, wherein the current first type data transaction is a posted transaction.

12. The method of claim 1, wherein the current second type data transaction is a non-posted transaction.

13. The method of claim 1, wherein the current second type data transaction is a completion transaction.

14. The method of claim 1, wherein the transaction clump tag of the current first type data transaction is contained within the first type data transaction.

15. The method of claim 1, further comprising replacing the transaction clump tag of the current first type data transaction with one or more reserved bit values.

16. The method of claim 1, wherein the initial count value is equal to two.

17. A data system of processing a plurality of data transaction, wherein the plurality of data transaction can be of a first transaction type or a second transaction type, the data system comprising:
  means for initializing a first counter to an initial count value;
  means for incrementing the first counter when a second-transaction-type bit of a transaction clump tag of a previous first type data transaction is not equal to a second-transaction-type bit of a transaction clump tag of a current first type data transaction; and
  means for decrementing the first counter when a second-transaction-type bit of a transaction clump tag of a previous second type data transaction is not equal to a second-transaction-type bit of a transaction clump tag of a current second type data transaction.

18. The data system of claim 17, further comprising means for blocking the current second type data transaction when the first counter is at a value equal to the initial count value minus 1 and there are received but unprocessed first type data transactions.

19. The data system of claim 18, wherein the means for blocking the current second type data transaction when the first counter is at a value equal to the initial count value minus 1 and there are received but unprocessed first type data transactions further comprises means for driving a second transaction type blocking signal to a blocked logic state.

20. The data system of claim 18, further comprising means for blocking the current second type data transaction when the first counter is at a value equal to the initial count value minus 2.

21. The data system of claim 20, wherein the means for blocking the current second type data transaction when the first counter is at a value equal to the initial count value minus 2, further comprises means for driving a second transaction type blocking signal to a blocked logic state.

22. The data system of claim 17, further comprising:
  means for initializing a second counter to the initial count value;
  means for incrementing the second counter when a third-transaction-type bit of a transaction clump tag of a previous first type data transaction is not equal to a third-transaction-type bit of a transaction clump tag of a current first type data transaction; and
  means for decrementing the second counter when a third-transaction-type bit of a transaction clump tag of a previous third type data transaction is not equal to a third-transaction-type bit of a transaction clump tag of a current third type data transaction.

23. The data system of claim 22, further comprising means for blocking the current third type data transaction when the second counter is at a value equal to the initial count value minus 1 and there are received but unprocessed first type data transactions.

24. The data system of claim 23, wherein the means for blocking the current third type data transaction when the second counter is at a value equal to the initial count value minus 1 and there are received but unprocessed first type data transactions, further comprises means for driving a third-transaction-type blocking signal to a blocked logic state.

25. The data system of claim 22, further means for comprising blocking the current third type data transaction when the second counter is at a value equal to the initial count value minus 2.

26. The data system of claim 25, wherein the means for blocking the current third type data transaction when the second counter is at a value equal to the initial count value minus 2, further comprises means for driving a third-transaction-type blocking signal to a blocked logic state.

27. The data system of claim 17, wherein the current first type data transaction is a posted transaction.

28. The data system of claim 17, wherein the current second type data transaction is a non-posted transaction.

29. The data system of claim 17, wherein the current second type data transaction is a completion transaction.

30. The data system of claim 17, wherein the transaction clump tag of the current first type data transaction is contained within the first type data transaction.

31. The data system of claim 17, further comprising means for replacing the transaction clump tag of the current first type data transaction with one or more reserved bit values.

32. The data system of claim 17, wherein the initial count value is equal to two.

* * * * *